3,758,504
VINYLCYCLOPROPANECARBOXYLATES
Masanao Matsui, Tokyo, and Yositose Okuno, Toyonaka, Japan, assignors to Sumitomo Chemical Company Limited, Osaka, Japan
No Drawing. Filed Mar. 16, 1971, Ser. No. 124,951
Claims priority, application Japan, Mar. 19, 1970, 45/23,731
Int. Cl. C07d 63/12, 5/16; C07c 69/74
U.S. Cl. 260—332.2 R                7 Claims

ABSTRACT OF THE DISCLOSURE

Vinylcyclopropanecarboxylates having an excellent insecticidal activity and a property harmless to mammals and cattles, of the formula, $$RO-\underset{\underset{O}{\|}}{C}-CH\underset{\underset{CH_3}{\diagup}\underset{CH_3}{\diagdown}}{\diagdown\diagup}CH-CH=CH_2$$

wherein R is 2-propargyl-3-methyl-2-cyclopentene-1-one-4-yl, $$R_2\!\!-\!\!\underset{\underset{R_1}{\diagdown_X\diagup}}{\square}\!\!-CH_2- \quad \text{or} \quad \underset{R_1}{\diagup\!\!\diagdown}\!\!\overset{R_2}{\diagdown\!\!\diagup}\!\!-CH_2-$$

wherein $R_1$ is allyl, propargyl, benzyl, thenyl, furylmethyl or phenoxy, $R_2$ is hydrogen, or $R_1$ and $R_2$ are bonded at respective ends to form a polymethylene group having 3 to 4 carbon atoms, and X is oxygen or sulfur.

---

This invention relates to novel vinylcyclopropanecarboxylates represented by the Formula I, $$RO-\underset{\underset{O}{\|}}{C}-CH\underset{\underset{CH_3}{\diagup}\underset{CH_3}{\diagdown}}{\diagdown\diagup}CH-CH=CH_2 \qquad (I)$$

wherein R is 2-propargyl-3-methyl-2-cyclopentene-1-one-4-yl, $$R_2\!\!-\!\!\underset{\underset{R_1}{\diagdown_X\diagup}}{\square}\!\!-CH_2- \quad \text{or} \quad \underset{R_1}{\diagup\!\!\diagdown}\!\!\overset{R_2}{\diagdown\!\!\diagup}\!\!-CH_2-$$

(II)                               (III)

wherein $R_1$ is allyl, propargyl, benzyl, thenyl, furylmethyl or phenoxy, $R_2$ is hydrogen, or $R_1$ and $R_2$ are bonded at respective ends to form a polymethylene group having 3 to 4 carbon atoms, and X is oxygen or sulfur; a process for preparing the same; and insecticidal compositions containing the same as active ingredients.

Various insecticides of the cyclopropanecarboxylic acid ester type have heretofore been known, and there are several esters also in pyrethrum components.

Among many insecticides available at present, the pyrethrum extracts have widely been used for the control of sanitary injurious insects and agricultural and horticultural injurious insects, because of their excellent insecticidal effect, low toxicity to mammals and quick acting on injurious insects and because they hardly impart vital resistance to injurious insects. However, they are expensive and are not particularly excellent in persistency of insecticidal effect. Accordingly, a large number of homologous compounds have been synthesized by many researchers. However, the synthesized products, which are commercially available at present, have their merits and demerits and, when used singly, they just satisfy some of the requirement for insecticides.

An object of the present invention is to provide novel vinylcyclopropanecarboxylates free from the above-mentioned drawbacks.

Another object of the invention is to provide a process for preparing the same.

A further object of the invention is to provide insecticidal compositions containing the same as active ingredients which are more excellent in insecticidal effect than those of the conventional insecticides.

The esters represented by the Formula I are novel compounds, and can be obtained by reacting a compound of the Formula V or VI, $$R_2\!\!-\!\!\underset{\underset{R_1}{\diagdown_X\diagup}}{\square}\!\!-CH_2-A \quad \text{or} \quad \underset{}{\diagup\!\!\diagdown}\!\!\overset{R_2}{\diagdown\!\!\diagup}\!\!-CH_2-A$$

(V)                               (VI)

wherein $R_1$, $R_2$ and X are as defined above and A is hydroxyl or a halogen, or 2-propargyl-3-methyl-4-hydroxy-2-cyclopentene-1-one, with a cyclopropanecarboxylic acid of the Formula IV or a reactive derivative thereof, $$HOOC-CH\underset{\underset{CH_3}{\diagup}\underset{CH_3}{\diagdown}}{\diagdown\diagup}CH-CH=CH_2 \qquad (IV)$$

if necessary in the presence of a suitable reaction adjuvant. The reactive derivative referred to herein indicates an acid halide, an acid anhydride an ester or a salt of an alkali metal or an organic base.

Procedures for synthesis of the present esters are explained in detail below.

(1) In case a carboxylic acid of the Formula IV is used, the reaction is accomplished under dehydration conditions. That is, the acid is reacted at or above room temperature with an alcohol of the Formula V or VI, or with 2 - propargyl-3-methyl-4-hydroxy-2-cyclopentene-1-one, in a suitable inert solvent in the presence of such a dehydrating agent as dicyclohexyl carbodiimide, whereby a desired ester can be obtained in a high yield.

(2) In case an acid halide is used as the reactive derivative of the carboxylic acid of the Formula IV, the object can be sufficiently accomplished by reacting the acid halide at room temperature with the aforesaid alcohol, using as a dehydrogen halide agent an organic tertiary base such as pyridine or triethylamine. The acid halide used in this case may be any of those within the scope of the invention, but is ordinarily an acid chloride. In the reaction, the presence of a solvent is preferable for smooth reaction. As the solvent, there is ordinarily used such an inert solvent as benzene, toluene or petroleum benzine.

(3) In case an acid anhydride is used as the reactive derivative of the carboxylic acid of the Formula IV, the object can be accomplished by reacting the anhydride with the aforesaid alcohol, without any auxiliary agent. In this case, the elevation of temperature is preferable for acceleration of the reaction, and the use of an inert solvent such as toluene or xylene is preferable for smooth reaction.

(4) In case an ester of lower alkyl alcohol, e.g. a methyl ester, is used as the reactive derivative of the carboxylic acid of the Formula IV, the ester is reacted at an elevated temperature with the alcohol of the Formula V or VI, or with 2-propargyl-3-methyl-4-hydroxy-2-cyclopentene-1-one, in an inert solvent such as toluene in the presence of a suitable organic base catalyst, preferably a metal alkoxide corresponding to the low boiling alcohol, e.g. sodium methylate, thereby effecting an ester exchange reaction, while removing the formed lower alkyl alcohol by a rectifier, whereby a desired ester can be obtained.

(5) In case a salt of an alkali metal or an organic tertiary base is used as the reactive derivative of the carboxylic acid of the Formula IV, the salt is reacted with the halide of the Formula V or VI in the presence of an inert solvent such as benzene and acetone. The reaction may be preferably conducted under heating to or below boiling point of the solvent in order to accelerate the reaction. In this reaction it is not always necessary to form the salt of the carboxylic acid, and the alkali metal or the organic tertiary base may be added simultaneously together with the carboxylic acid of the Formula IV to the halide. The chloride [A in the Formula V or VI being chlorine] is usually employed and it is needless to say that the other halide, such as bromide may also be employed.

The cyclopropanecarboxylic acid of the Formula IV is a novel compound and may be prepared from 2,2-dimethyl-3-formylcyclopropanecarboxylic ester and triphenyl methylene phosphoran according to the Wittig reaction, or from β,β-dimethylacrylic ester and phenyl allyl sulphone.

The carboxylic acids of the Formula IV involve optical and geometrical isomers derived from steric structures and asymmetric carbon atoms, but propenyl groups on the cyclopropane rings are in cis-configuration with respect to the double bonds, and no trans-isomers are involved.

Further, the reactive derivatives of these carboxylic acids can be easily obtained according to ordinary procedures from the carboxylic acids. That is, the acid halides are obtained by halogenating the carboxylic acids with thionyl halides or phosphorus halides, and the acid anhydrides by reflux of the carboxylic acids together wtih acetic anhydride.

Examples of the compound of the Formula V and VI are as follows:

5-benzyl-3-furylmethyl alcohol
5-(2'-thenyl)-3-furylmethyl alcohol
5-benzyl-2-thenyl alcohol
3-benzylbenzyl alcohol
5-propargylfurfuryl alcohol
5-propargyl-2-thenyl alcohol
4-propargylbenzyl alcohol
5-allylfurfuryl alcohol
4-allylbenzyl alcohol
4,5-tetramethylenefurfuryl alcohol
4,5-tetramethylene-2-thenyl alcohol
4,5-trimethylene-2-thenyl alcohol
5-phenoxyfurfuryl alcohol
5-phenoxy-3-furylmethyl alcohol
5-phenoxy-2-thenyl alcohol
3-phenoxybenzyl alcohol
2-propargyl-3-methyl-4-hydroxy-2-cyclopentene-1-one

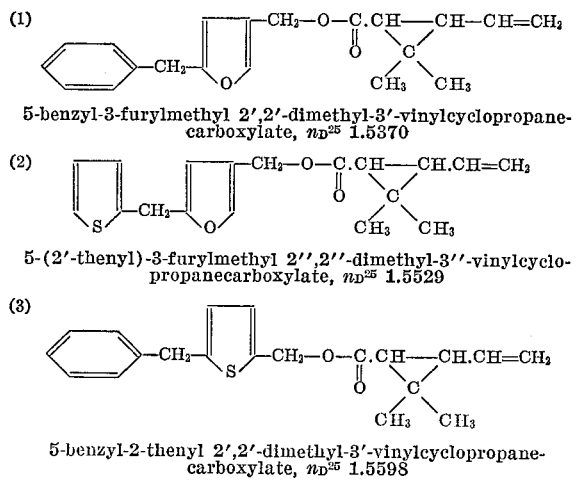
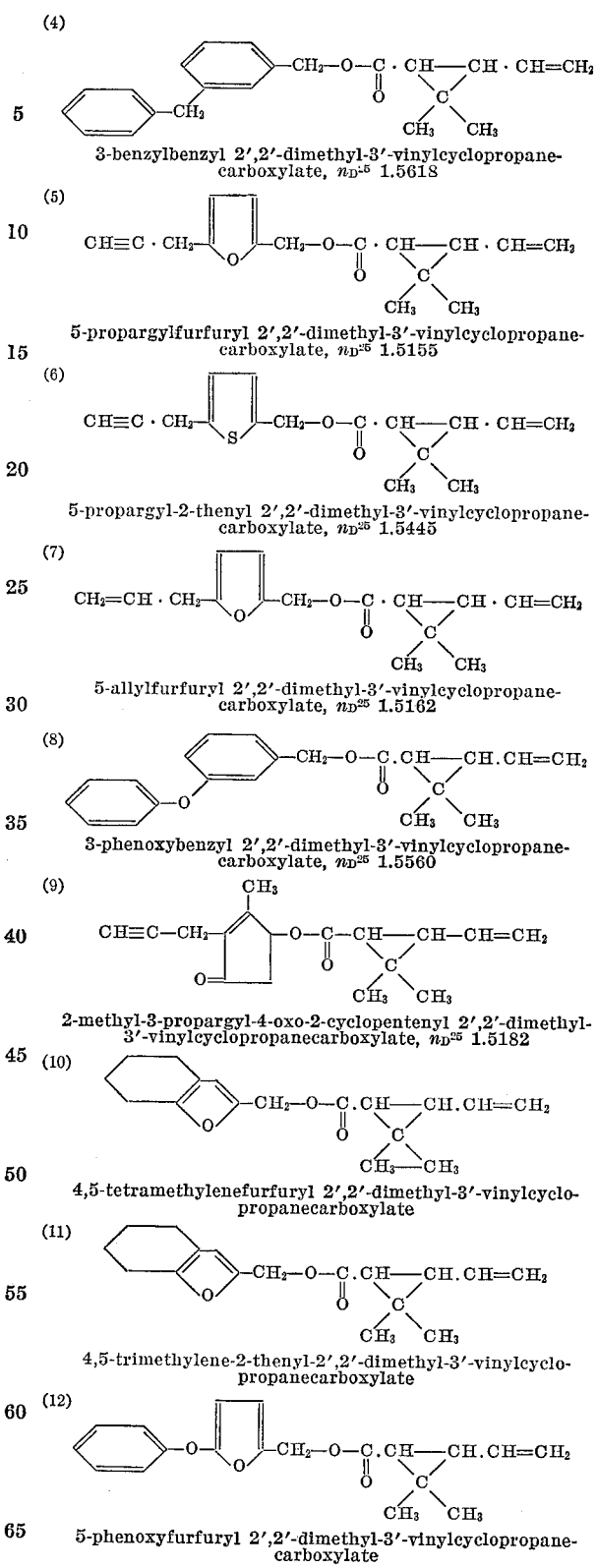

Procedures for synthesis of the present compounds are illustrated below in further detail with reference to examples.

EXAMPLE 1

To a solution of 9.4 g. of 5-benzyl-3-furylmethyl alcohol in 30 ml. of dry benzene was added 6.3 g. of dry pyridine. To this solution was added with ice cooling a solution of 8.4 g. of 2,2-dimethyl-3-vinylcyclopropanecarboxylic acid chloride in 25 ml. of dry benzene, and the mixed solution was allowed to stand overnight. Thereafter, the reaction liquid was poured into ice water, and then the organic layer was washed successively with a 5% aqueous hydrochloric acid solution, a saturated aqueous sodium hydrogencarbonate solution and a saturated sodium chloride solution. The benzene layer was dried over anhydrous magnesium sulfate, and then the benzene was removed by distillation. Subsequently, the residue was purified through a column packed with active alumina to obtain 13.7 g. of an ester as a then the acetone was removed by vaporization to prepare mosquito coils. Subsequently, 1 g. of each of the mosquito coils was ignited on both ends and placed in a (70 cm.$^3$) glass chamber, in which had been liberated about 20 adults of Northern house mosquitoes, and then the number of knocked-down insects was counted with lapse of time. After 24 minutes, knocked-down insects were collected, fed and allowed to stand for 1 day, and the alive and dead thereof were observed. From the results of said counting and observation, $KT_{50}$ (50% knock-down time) and mortality were calculated to obtain the values as set forth in the following table:

| Test compound | | $KT_{50}$ (min. sec.) | Knock down mortality (percent) |
|---|---|---|---|
| Present compound (1) | 0.6% mosquito coil | 7′06″ | 85 |
| Chrysanthemic acid ester corresponding to (1) | do | 12′00″ | 94 |
| Present compound (2) | 0.6% mosquito coil | 7′24″ | 82 |
| Chrysanthemic acid ester corresponding to (2) | do | 13′12″ | 90 |
| Present compound (5) | 0.6% mosquito coil | 5′00″ | 80 |
| Chrysanthemic acid ester corresponding to (5) | do | 7′18″ | 87 |
| Present compound (6) | 0.6% mosquito coil | 5′06″ | 85 |
| Chrysanthemic acid ester corresponding to (6) | do | 7′54″ | 89 |
| Present compound (12) | 0.6% mosquito coil | 8′00″ | 80 |
| Chrysanthemic acid ester corresponding to (12) | do | 12′18″ | 82 |
| Present compound (9) | 0.6% mosquito coil | 4′42″ | 71 |
| Chrysanthemic acid ester corresponding to (9) | do | 6′48″ | 74 |
| Pyrethrin | 0.6% mosquito coil | 11′24″ | 70 | pale yellow oil, $n_D^{25}$ 1.5370. The thus obtained ester had the following structure:

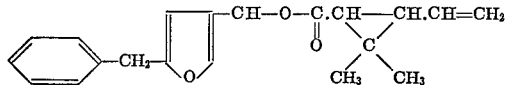

Elementary analysis.—For $C_{20}H_{22}O_3$. Found (percent): C, 77.64; H, 7.33. Calcd. (percent): C, 77.39; H, 7.14.

EXAMPLE 2

A solution of 9.4 g. of 5-benzyl-3-furylmethyl alcohol and 2,2-dimethyl-3-vinylcyclopropanecarboxylic acid anhydride in 60 ml. of toluene was refluxed for 4 hours. After cooling, the reaction liquid was washed successively with a 2% aqueous sodium hydroxide solution and a saturated sodium chloride solution, and then dried over anhydrous magnesium sulfate. Thereafter, the toluene was removed by distillation, and the residue was purified through column packed with active alumina to obtain 13.2 g. of the same ester as in Example 1.

The thus obtained esters of the present invention which are represented by the Formula I are low toxic, have prominent insecticidal effects and display more excellent properties than those of esters of so-called crysanthemic and pyrethric acids which are different in acid portion from the present esters. Particularly in knock down effect, the present esters are more excellent than corresponding chrysanthemic acid esters.

In order to make the above fact clearer, experimental examples, in which typical examples of the present esters were compared with corresponding chrysanthemic acid esters and pyrethric acid esters, and the results obtained in said experimental examples, are set forth below. A tendency of the same biological activities as those of said typical examples was observed also in the case of other compounds of the Formula I and isomers thereof. This tendency is the same with respect to geometrical isomers and optical isomers.

EXPERIMENTAL EXAMPLE

The present compounds (1), (2), (5), (6), (9) and (12), chrysanthemic acid esters corresponding thereto, and pyrethrin were individually dissolved in acetone and absorbed in a dry mosquito coil carrier so that the amount of each compound became 0.6% by weight, and As is clear from the above-mentioned experimental examples, the present compounds have excellent insecticidal and knock down effects on mosquitoes. Furthermore, they display prominent insecticidal activities on sanitary injurious insects such as houseflies, cockroaches, etc. and insects injurious to stored cereals, and are low toxic to mammals. Owing to such characteristics of the present compounds, insecticidal compositions containing the present compounds as active ingredients find wide uses for the prevention of epidemics and for the control of stored cereal-injurious insects. Further, the said compositions are broad in insecticidal activity, and hence are quite useful for the control of agricultural injurious insects such as green rice leafhoppers, brown planthoppers, larvae of Japanese giant silk moth, common cabbage worms, cabbage army worms, larvae of diamond back moth, common cutworms and the like, and forestry injurious insects. Particularly, the compositions are not only low toxic and harmless to mammals but also have repellent effects, so that they are freely applicable to crops before harvest, foods and packaging materials, and are usable for home horticulture and green house cultivation.

In preparing the compositions of the present invention, the present compounds may be formulated into any of oil sprays, emulsifiable concentrates, dusts, wettable powders, aerosols, granules, mosquito coils, and other heating or non-heating fumigants, according to procedures thoroughly known to those skilled in the art, using diluents for general insecticides, like in the case of the conventional pyrethroides. Alternatively, the present compounds may be formulated into death-inducing powder or solid preparations incorporated with baits or the like materials attractive for injurious insects.

The present compounds can display more prominent insecticidal activities when used in combination of two or more of the present compounds, and can be enhanced in insecticidal effect when used in admixture with such synergists for pyrethroides as α-[2-(2-butoxyethoxy)ethoxy]4,5-methylenedioxy-2-propyltoluene (hereinafter referred to as "piperonyl butoxide"), 1,2-methylenedioxy-4-[2-(octylsulfinyl)propyl] benzene (hereinafter referred to as "sulfoxide"), 4-(3,4-methylenedioxyphenyl)-5-methyl-1,3-dioxane (hereinafter referred to as "sulfoxane"), N - (2 - ethylhexyl) - bicyclo[2,2,1]hepta-5-ene-2,3-dicarboximide (hereinafter referred to as "MGK- 264") and octachlorodipropyl ether (hereinafter referred to as "S–421"), or other known synergists effective for allethrin and pyrethrin.

Further, the present compounds are incorporated with suitable amounts of, as stabilizers, phenol derivatives such as BHT, or arylamines such as phenyl-α-naphthylamine, phenyl-β-naphthylamine and phenetidineacetone condensates, whereby insecticidal compositions more stabilized in effect can be obtained.

Still further, the present compounds are used in admixture with other physiologically active substances, e.g. known cyclopropanecarboxylic acid ester type insecticides such as pyrethrin (pyrethrum extract), allethrin, N-(chrysanthemoxymethyl) - 3,4,5,6-tetrahydrophthalimide (hereinafter referred to as "phthalthrin"), 5-benzyl-3-furylmethyl chrysanthemate (hereinafter referred to as "Chrysron," registered trade mark of Sumitomo Chemical Co., Ltd.; the same shall apply hereinafter), 5-propargyl-furfuryl chrysanthemate and their geometrical and optical isomers, organo-chlorine type insecticides.

EXAMPLE 3

0.2 part of each of the present compounds (1), (2), (3), (4), (8), (10) and (12) was dissolved in deodorized kerosene to make the total amount 100 parts, whereby oil sprays of the respective compounds were obtained.

EXAMPLE 4

A mixture comprising 0.1 part of each of the present compounds (1), (2), (3), (5), (6), (7), (9) and (11) and 0.5 part of piperonyl butoxide was dissolved in deodorized kerosene to make the total amount 100 parts, whereby oil sprays of the respective compounds were obtained.

EXAMPLE 5

0.1 part of each of the present compounds (5), (6), (7), (9) and (12) was dissolved in deodorized kerosene to make the total amount 100 parts, whereby oil sprays of the respective compounds were obtained.

EXAMPLE 6

A mixture comprising 0.4 part of the present compound (1), 2 parts of piperonyl butoxide, 6 parts of xylene and 6.6 parts of deodorized kerosene was packed in an aerosol container. After attaching a valve portion to the container, 85 parts of a propellant (liquefied petroleum gas) was introduced under pressure through said valve portion into the container to obtain an aerosol.

EXAMPLE 7

A mixture comprising 0.3 part of the present compound (5), 0.1 part of Chrysron, 2 parts of piperonyl butoxide, 6 parts of xylene and 6.6 parts of deodorized kerosene was treated in the same manner as in Example 6 to obtain an aerosol.

EXAMPLE 8

A mixture comprising 0.2 part of the present compound (12), 0.2 part of Chrysron, 7 parts of xylene and 7.6 parts of deodorized kerosene was treated in the same manner as in Example 6 to obtain an aerosol.

EXAMPLE 9

A mixture comprising 0.4 part of the present compound (9), 0.5 part of Sumithion. 7 parts of xylene and 7.1 parts of deodorized kerosene was treated in the same manner as in Example 6 to obtain an aerosol.

EXAMPLE 10

A mixture comprising 0.2 part of the present compound (8), 0.2 part of phthalthrin, 3.2 parts of piperonyl butoxide, 10.4 parts of deodorized kerosene and 1 part of an emulsifier Atmos 300 was emulsified by addition of 50 parts of pure water. Thereafter, the emulsified mixture was packed in an aerosol container together with 35 parts of a 3:1 mixture of deodorized butane and deodorized propane to obtain a water-based aerosol.

EXAMPLE 11

A mixture comprising 5 parts of each of the present compounds (1), (3), (4), (5), (8), (10), and (12), 15 parts of sulfroxane and 10 parts of Sorpol SM–200 was thoroughly stirred together with 70 parts of xylene to obtain emulsifiable concentrates of the respective compounds.

EXAMPLE 12

A mixture comprising 20 parts of the present compound (1, 5 parts of 1-naphthyl-N-methylcarbamate and 5 parts of Sorpol SM–200 was thoroughly stirred in a mortar together with 70 parts of 300-mesh talc to obtain a wettable powder.

EXAMPLE 13

To a solution of 1 part of each of the present compounds (1), (3), (5) and (8) and 3 parts of piperonyl butoxide in 20 parts of acetone was added 96 parts of 300-mesh diatomaceous earth. The resulting mixture was thoroughly stirred in a mortar, and then the acetone was removed by vaporization to obtain dusts of the respective compounds.

EXAMPLE 14

A mixture comprising 5 parts of the present compound (1) and 5 parts of Toyolignin CT was thoroughly stirred in a mortar together with 90 parts of GSM clay. The resulting mixture was kneaded with 10%, based on the amount of said mixture, of water and granulated by means of a granulator, followed by air-drying, to obtain a granule.

EXAMPLE 15

A solution of 0.5 g. of each of the present compounds (5), (6) and (9) in 20 ml. of methanol was uniformly stirred together with 99.5 g. of a mosquito coil carrier (a 3:5:1 mixture of Tabu powder, pyrethrum marc and wood flour). After vaporizing the methanol, the residue was thoroughly kneaded with 150 ml. of water, and then shaped and dried to obtain mosquito coils of the respective compounds.

EXAMPLE 16

A solution of 0.3 g. of each of the present compounds (1), (2), (3), (7) and (12) and 0.2 g. of allethrin in 20 ml. of methanol was treated in the same manner as in Example 15 to obtain mosquito coils of the respective compounds.

EXAMPLE 17

A solution of 0.3 g. of each of the present compounds (4), (8), (10) and (11) and 0.2 g. of 5-propargylfurfuryl chrysanthemate in 20 ml. of methanol was treated in the same manner as in Example 15 to obtain mosquito coils of the respective compounds.

EXAMPLE 18

A solution of 0.2 g. of the present compound (1) and 0.2 g. of allethrin in a suitable amount of chloroform was applied to an asbestos piece of 2.5 cm. x 1.5 cm. in area and 0.3 mm. in thickness to obtain a fibrous heating fumigant.

Insecticidal effects of the thus obtained compositions of the present invention are as set forth in the following examples:

TEST EXAMPLE 1

According to the Campbell's turntable method (Soap and Sanitary Chemicals, vol. 14, No. 6, page 119, 1938), 5 ml. of each of the oil sprays obtained in Examples 3 and 4 was sprayed, and a group of about 100 adults of house flies were exposed to the settling mist for 10 minutes. Thereafter, the flies were taken out, fed and allowed to stand for 1 day. As the result, every oil spray could kill more than 80% of the flies.

TEST EXAMPLE 2

About 50 adults of house flies were liberated in a (70 cm.³) glass chamber, and 0.7 ml. of each of the oil sprays obtained in Example 5 was sprayed to the flies under a pressure of 20 lbs. by use of a glass atomizer. As the result, more than 80% of the flies could be knocked down within 10 minutes.

TEST EXAMPLE 3

Insecticidal effects on house fly adults of the aerosols obtained in Examples 6, 7, 8, 9 and 10 were tested according to the aforesaid aerosol test method using a Peet Grady's chamber (6 ft.³). The results obtained were set forth in the following table:

| Composition | Sprayed amount (g./1,000 ft.³) | Knock down ratio (percent) 5 min. | 10 min. | 15 min. | Mortality (percent) |
|---|---|---|---|---|---|
| Aerosol of Example 6 | 3.0 | 21 | 53 | 90 | 86 |
| Aerosol of Example 7 | 3.0 | 27 | 62 | 94 | 81 |
| Aerosol of Example 8 | 3.2 | 24 | 58 | 95 | 84 |
| Aerosol of Example 9 | 2.9 | 32 | 69 | 96 | 92 |
| Water-based aerosol of Example 10 | 3.1 | 26 | 65 | 92 | 80 |

TEST EXAMPLE 4

Each of the emulsifiable concentrates obtained in Example 11 was diluted with water to 20,000 times, and 2 liters of the resulting dilution was charged into a polystyrol-made case of 23 cm. x 30 cm. in size and 6 cm. in depth. Subsequently, about 100 full-grown larvae of Northern house mosquitoes were liberated in the case, whereby more than 90% of the larvae could be killed on the next day.

TEST EXAMPLE 5

Rice plants, which had elapsed 45 days after sowing, were grown in 1/50,000 Wagner pots. On the other hand, the emulsifiable concentrate containing the present compound (3), among the emulsifiable concentrates obtained in Example 11, and the wettable powder obtained in Example 12 were individually diluted with water to 100 times. Each of the resulting dilutions was sprayed to the rice plants in a proportion of 10 ml./pot. Subsequently, each pot was covered with a wire net, and about 30 adults of green rice leafhoppers were liberated in the net. As the result, more than 80% of the leafhoppers could be killed on the next day.

TEST EXAMPLE 6

100 grams of unhulled rice grains were thoroughly stirred together with 200 mg. of each of the dusts obtained in Example 13, and the resulting mixture was charged into a 100 ml. glass Erlenmeyer flask. Into the flask were liberated about 50 rice weevils, and then the flask was covered. As the result, more than 80% of the weevils could be killed within one week.

TEST EXAMPLE 7

Into a 14 liter-polyethylene bucket containing 10 liters of water was charged 1 g. of the granule obtained in Example 14. After 1 day, about 100 full-grown larvae of Northern house mosquitoes were liberated in the water, and the alive and dead of the larvae were observed. As the result, more than 90% of the larvae could be killed within 24 hours.

TEST EXAMPLE 8

About 50 adults of Northern house mosquitoes were librated in a (70 cm.³) glass chamber, and a battery-driven small motor fan (13 cm. in blade diameter) was put in the chamber and rotated. Subsequently, 0.5 g. of each of the mosquito coils obtained in Examples 15, 16 and 17 was ignited on both ends and placed in the chamber. As the result, every mosquito coil could knock down more than 80% of the mosquitoes within 20 minutes.

TEST EXAMPLE 9

About 50 adults of house flies were liberated in a (70 cm.³) glass chamber, and a battery-driven small motor fan (13 cm. in blade diameter) was put in the chamber and rotated. Thereafter, the heating fumigant composition obtained in Example 18 was placed on an electrically heated plate and fumigated in the chamber. As the result, more than 80% of the flies could be killed within 20 minutes.

What is claimed is:

1. A compound of the formula,

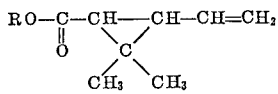

wherein R is 2-propargyl-3-methyl-2-cyclopentene-1-one-4-yl, or

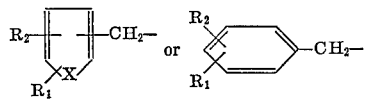

wherein $R_1$ is allyl, propargyl, benzyl, thenyl, furylmethyl or phenoxy, $R_2$ is hydrogen, or $R_1$ and $R_2$ at adjacent ring positions are bonded at respective ends to form a polymethylene group having 3 to 4 carbon atoms, and X is oxygen or sulfur.

2. A compound of claim 1, wherein R is

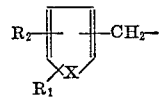

wherein $R_1$, $R_2$ and X are as defined in claim 1.

3. A compound of claim 2, wherein X is oxygen.
4. A compound of claim 2, wherein $R_1$ is benzyl.
5. A compound of claim 2, wherein $R_1$ is thenyl.
6. A compound of the formula,

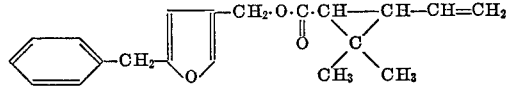

7. A compound of the formula,

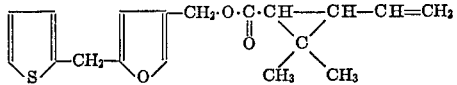

References Cited

UNITED STATES PATENTS

| | | | |
|---|---|---|---|
| 3,387,003 | 6/1968 | Martel et al. | 260—343.5 |
| 3,484,489 | 12/1969 | Kierstead et al. | 260—586 |
| 3,515,730 | 6/1970 | Matsui et al. | 260—332.2 |
| 3,465,007 | 9/1969 | Elliott | 260—347.4 |
| 3,414,607 | 12/1968 | Fujimoto et al. | 260—468 |
| 3,358,011 | 12/1967 | Elliott | 260—468 |
| 3,509,180 | 4/1970 | Elliott | 260—347.4 |
| 3,047,611 | 7/1962 | Moore et al. | 260—468 |

FOREIGN PATENTS

| | | | |
|---|---|---|---|
| 2,015,869 | 10/1970 | Germany | 260—332.2 |
| 1,550,606 | 11/1968 | France | 260—347.4 |
| 1,578,385 | 8/1969 | France | 260—347.4 |

HENRY R. JILES, Primary Examiner

C. M. S. JAISLE, Assistant Examiner

U.S. Cl. X.R.

260—346.2 R, 347.4, 468 P; 424—275, 285, 305, 306